United States Patent
Tseng et al.

(10) Patent No.: US 10,235,973 B2
(45) Date of Patent: Mar. 19, 2019

(54) PORTABLE DEVICE WITH MULTIPLE OPTICAL SENSING FUNCTIONS AND RELATED OPTICAL SENSING METHOD

(71) Applicant: MEDIATEK INC., Hsin-Chu (TW)

(72) Inventors: Kui-Chang Tseng, Kaohsiung (TW); Tsu-Ming Liu, Hsinchu (TW)

(73) Assignee: MEDIATEK INC., Hsin-Chu, Taiwan (CN)

( * ) Notice: Subject to any disclaimer, the term of this patent is extended or adjusted under 35 U.S.C. 154(b) by 501 days.

(21) Appl. No.: 14/975,851

(22) Filed: Dec. 20, 2015

(65) Prior Publication Data

US 2016/0178367 A1 Jun. 23, 2016

Related U.S. Application Data

(60) Provisional application No. 62/095,889, filed on Dec. 23, 2014.

(51) Int. Cl.
*G01J 1/44* (2006.01)
*G09G 5/30* (2006.01)
(Continued)

(52) U.S. Cl.
CPC .............. *G09G 5/30* (2013.01); *G06F 1/1684* (2013.01); *G06F 3/013* (2013.01); *G06F 3/017* (2013.01);
(Continued)

(58) Field of Classification Search
CPC ........ G06F 3/013; G06F 1/1684; G06F 3/017; G06F 3/0304; G09G 5/30; G09G 5/02; G06T 9/00; G06T 5/003
(Continued)

(56) References Cited

U.S. PATENT DOCUMENTS

| 7,297,934 | B2* | 11/2007 | Kane | ..................... G01S 17/023 250/206 |
| 2002/0176015 | A1* | 11/2002 | Lichtfuss | ............... H04N 5/225 348/333.1 |

(Continued)

FOREIGN PATENT DOCUMENTS

| CN | 1629620 A | 6/2005 |
| CN | 101661553 A | 3/2010 |
| JP | 9-307930 A | 11/1997 |

OTHER PUBLICATIONS

Gary Cutlack, Oppo N1 Review Oppo takes on the phablet market, but can it live up to the bigger billing? http://www.techradar.com/reviews/phones/mobile-phones/oppo-n1-1226085/review, Mar. 2014.

*Primary Examiner* — Georgia Y Epps
*Assistant Examiner* — Kevin Wyatt
(74) *Attorney, Agent, or Firm* — Winston Hsu

(57) ABSTRACT

An optical sensing method capable of changing a sensing direction of an optical sensing module is applied to a portable device, which includes a housing, an optical sensing module and an optical diverting mechanism. The optical sensing module is disposed inside the housing. The optical sensing module includes an optical emitter adapted to emit an optical sensing signal out of the housing and an optical receiver adapted to receive an optical modulated signal reflected from an external object. The optical diverting mechanism is adjacent by the optical sensing module. The optical sensing signal is directly projected while the optical sensing signal is not diverted by the optical diverting mechanism, and the optical sensing signal is transmitted to a second direction different from the first direction while the optical sensing signal is diverted by the optical diverting mechanism.

25 Claims, 21 Drawing Sheets

(51) Int. Cl.
    *G06F 3/01*          (2006.01)
    *G06T 5/00*          (2006.01)
    *G06T 9/00*          (2006.01)
    *G09G 5/02*          (2006.01)
    *G06F 1/16*          (2006.01)
    *G06F 3/03*          (2006.01)

(52) U.S. Cl.
    CPC ............ *G06F 3/0304* (2013.01); *G06T 5/003* (2013.01); *G06T 9/00* (2013.01); *G09G 5/02* (2013.01); *G06T 2210/36* (2013.01); *G09G 2320/0626* (2013.01); *G09G 2340/02* (2013.01)

(58) Field of Classification Search
    USPC ....................................................... 250/206
    See application file for complete search history.

(56) References Cited

U.S. PATENT DOCUMENTS

| | | | |
|---|---|---|---|
| 2007/0195294 A1* | 8/2007 | Willey .................. | G03B 21/26 353/119 |
| 2008/0292360 A1* | 11/2008 | Hirai ..................... | G01J 1/04 399/220 |
| 2011/0102875 A1* | 5/2011 | Yang .................. | G02B 26/0866 359/221.2 |
| 2011/0206283 A1 | 8/2011 | Quarfordt | |
| 2012/0206711 A1* | 8/2012 | Card ..................... | G01S 13/04 356/5.01 |

\* cited by examiner

PORTABLE DEVICE WITH MULTIPLE OPTICAL SENSING FUNCTIONS AND RELATED OPTICAL SENSING METHOD

CROSS REFERENCE TO RELATED APPLICATIONS

This application claims the benefit of U.S. provisional application No. 62/095,889, filed on Dec. 23, 2014. The disclosures of the prior application are incorporated herein by reference herein in their entirety.

BACKGROUND

The present invention relates to a portable device with optical sensing function and a related optical sensing method, and more particularly, to a portable device with multiple optical sensing functions and a related optical sensing method capable of changing a sensing direction of an optical sensing module.

Please refer to FIG. 1 and FIG. 2. FIG. 1 is a diagram of a mobile phone 50 with a proximity sensor 52 in prior art. FIG. 2 is a sectional view of the mobile phone 50 in prior art. A display screen 54 is disposed on an upper surface of a housing 56 of the mobile phone 50. The proximity sensor 52 includes an optical emitter 521 and an optical receiver 522. An optical sensing signal is emitted from the optical emitter 521 to pass through the upper surface of the housing 56. While the optical sensing signal is projected onto an external object, an optical modulated signal is reflected from the external object and received by the optical receiver 522, so as to active the proximity sensor 52. Therefore, a sensing range of the proximity sensor 52 is located above the upper surface of the housing 56. Functions of the conventional proximity sensor 52 is limited, and design of expanding possible application of the proximity sensor to provide new functions is an important issue in the mobile communication industry.

SUMMARY

The present invention provides a portable device with multiple optical sensing functions and a related optical sensing method capable of changing a sensing direction of an optical sensing module by an optical diverting mechanism for solving above drawbacks.

According to at least one claimed invention, a portable device with multiple optical sensing functions includes a housing, an optical sensing module and an optical diverting mechanism. The optical sensing module is disposed inside the housing. The optical sensing module includes an optical emitter and an optical receiver. The optical emitter is adapted to emit an optical sensing signal out of the housing at a first direction. The optical receiver is disposed by the optical emitter and adapted to receive an optical modulated signal reflected from an external object. The optical diverting mechanism is adjacent by the optical sensing module. The optical sensing signal is directly projected while the optical sensing signal is not diverted by the optical diverting mechanism, and the optical sensing signal is transmitted to a second direction different from the first direction while the optical sensing signal is diverted by the optical diverting mechanism.

According to at least one claimed invention, an optical sensing method capable of changing a sensing direction of an optical sensing module by functions of an optical diverting mechanism is disclosed. The optical sensing module has an optical emitter for emitting an optical sensing signal and an optical receiver for receiving an optical modulated signal reflected from an external object. The optical sensing method is applied to a portable device having the optical sensing module and the optical diverting mechanism. The optical sensing method includes driving the optical emitter to emit the optical sensing signal with a specific intensity while the optical diverting mechanism is not actuated to divert transmission of the optical sensing signal and the optical modulated signal, driving the optical emitter to emit the optical sensing signal with an increased intensity while the optical diverting mechanism is actuated to divert transmission of the optical sensing signal and the optical modulated signal, driving the optical receiver to read a raw datum of the optical modulated signal, and analyzing the raw datum to trigger functions of the portable device accordingly.

The portable device of the present invention utilizes the optical diverting mechanism to change signal transmission direction of the optical sensing module. The optical diverting mechanism can be the reflector or the rotary mechanical design, transmission direction of the optical sensing signal and the optical modulated signal is diverted by reflection of the reflector, arrangement of the optical emitter and the optical receiver is rotated by the rotary mechanical design. The optical diverting mechanism further can be cooperated with the light guiding component or the optical modulating component, the multi-sensing mode is executed by matching the light guiding component with the optical diverting mechanism, and the optical modulating component is applied to enlarge the sensing range of the optical sensing module. The portable device and the related optical sensing method of the present invention increase the sensing directions and enlarge the sensing range of the optical sensing module to provide more functions for ordinary proximity sensor embed in the portable device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
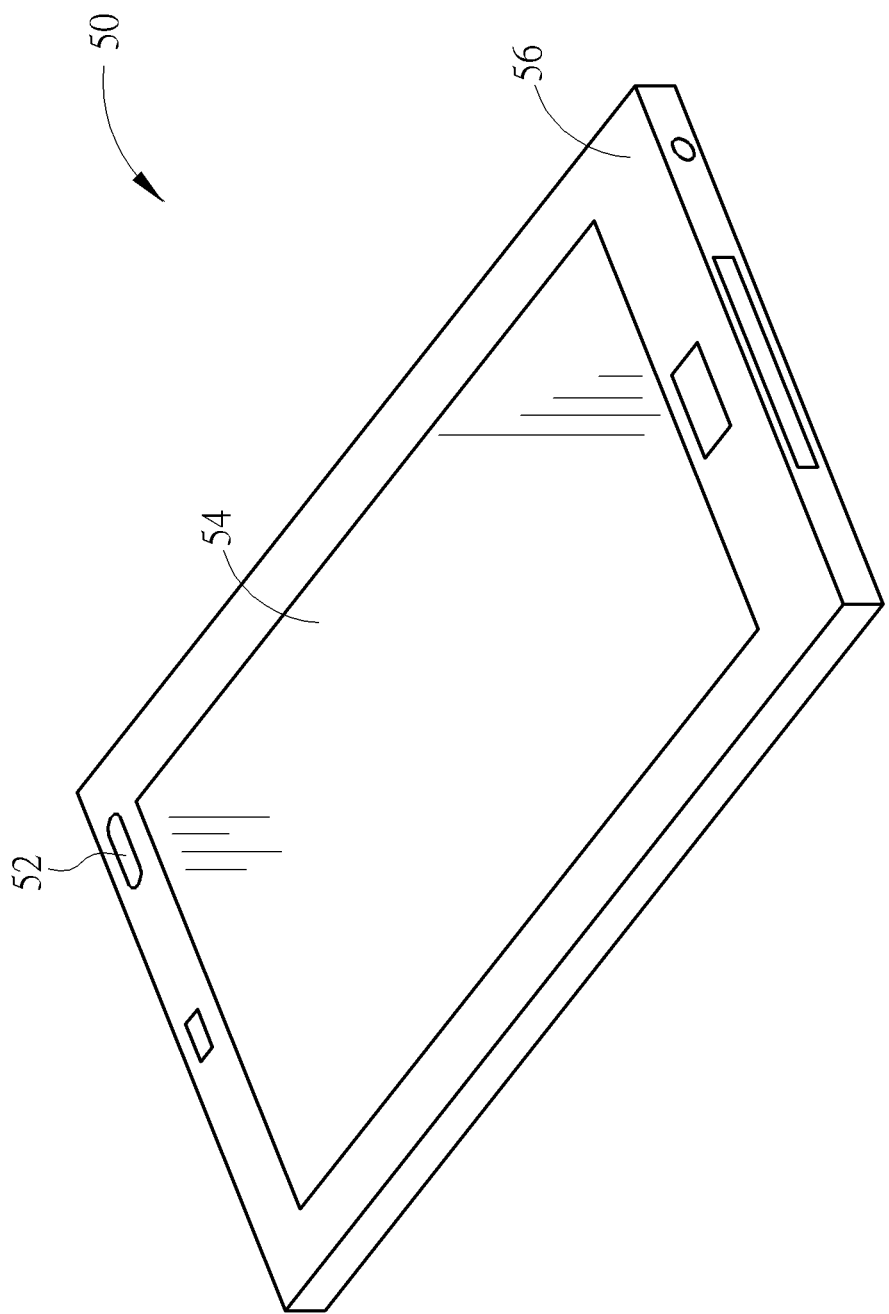
FIG. 1 is a diagram of a mobile phone with a proximity sensor in prior art.
Figure 2:
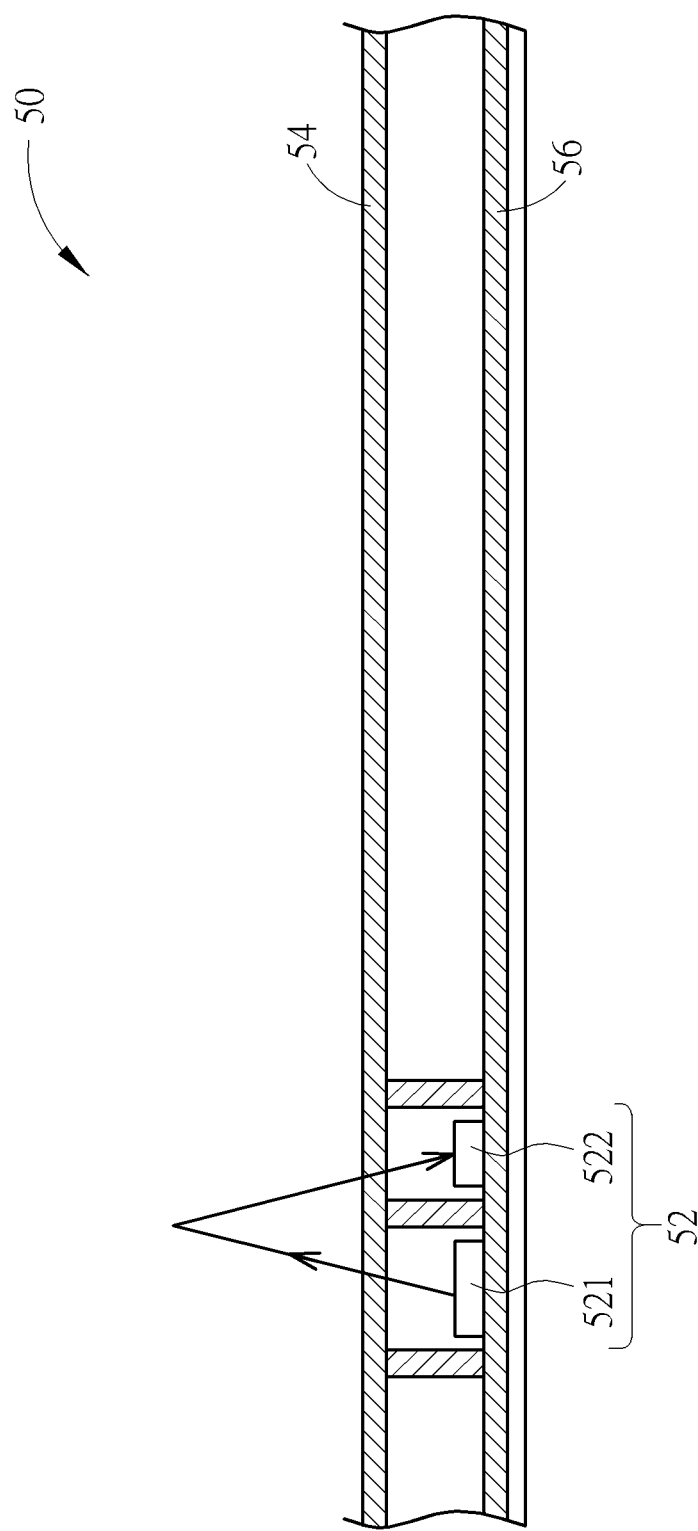
FIG. 2 is a sectional view of the mobile phone in prior art.
Figure 3:
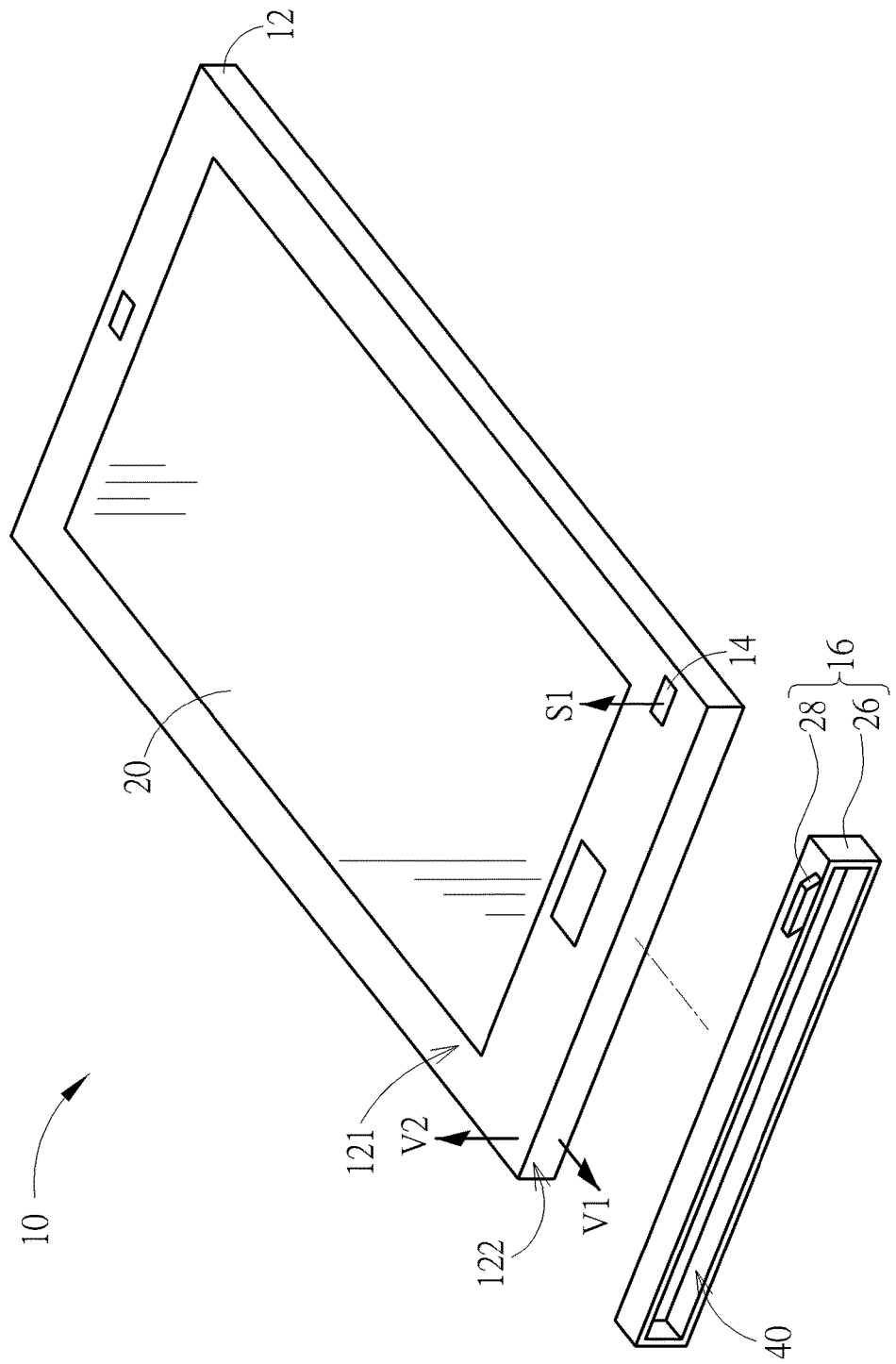
FIG. 3 is a diagram of a portable device having multiple optical sensing functions according to a first embodiment of the present invention.
Figure 4:
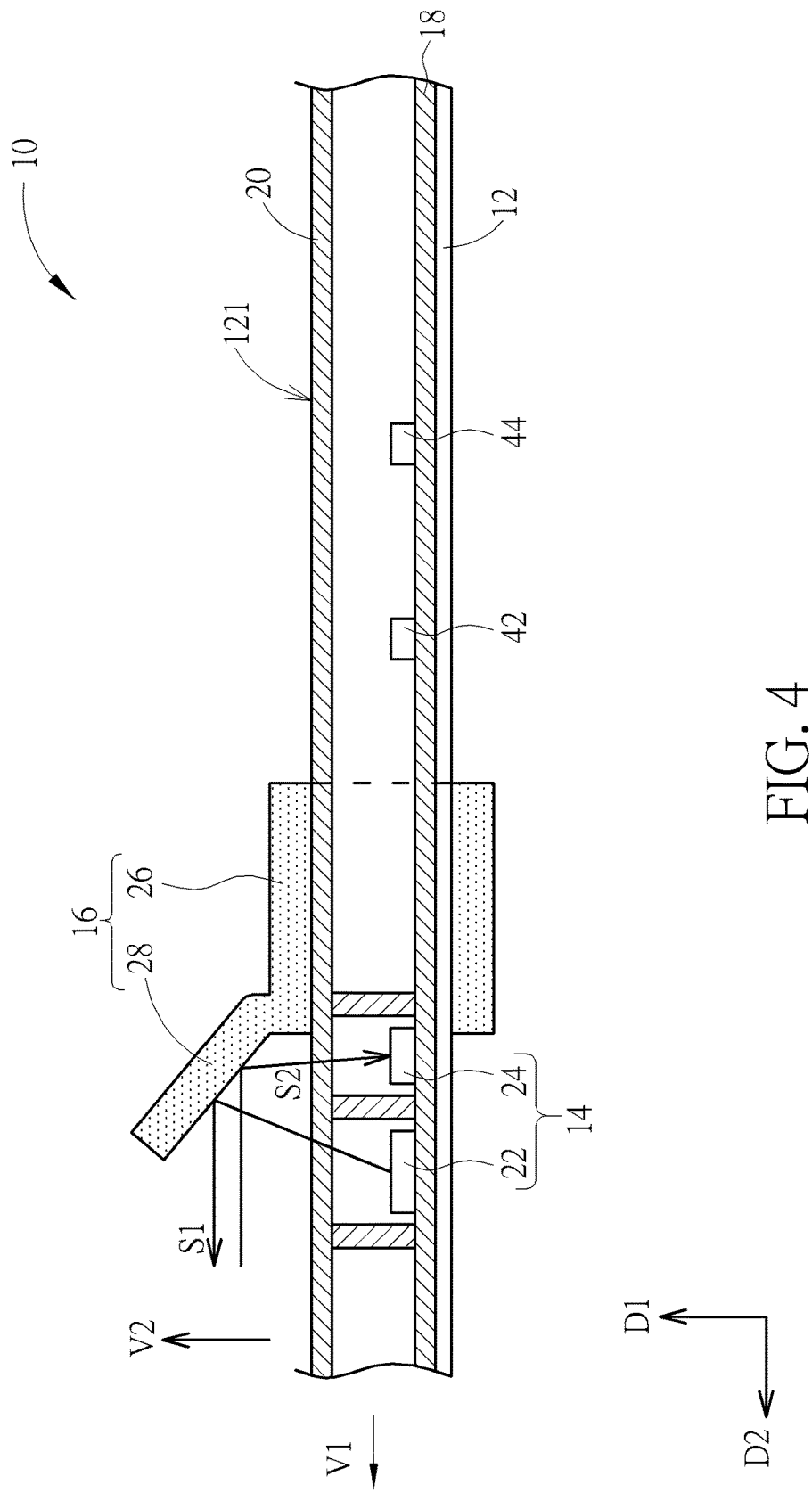
FIG. 4 is a sectional view of the portable device having the multiple optical sensing functions according to the first embodiment of the present invention.

Please refer to FIG. 3 and FIG. 4. FIG. 3 is a diagram of a portable device 10 having multiple optical sensing functions according to a first embodiment of the present invention. FIG. 4 is a sectional view of the portable device 10 having the multiple optical sensing functions according to the first embodiment of the present invention. The portable device 10 includes a housing 12, an optical sensing module 14 and an optical diverting mechanism 16. A circuit board 18, whereon the optical sensing module 14 is disposed, is installed inside the housing 12, and a display screen 20 is disposed on a first surface 121 of the housing 12. A region of the first surface 121 aligning with the optical sensing module 14 is preferably made by transparent material. The housing 12 further includes several second surfaces 122 respectively adjacent to corresponding edges of the first surface 121. The optical sensing module 14 is disposed inside the housing 12. In some embodiments, such optical sensing module 14 may be taken as a proximity sensor. The optical sensing module 14 includes an optical emitter 22 and an optical receiver 24, which may be located near each other. The optical emitter 22 emits an optical sensing signal S1 out of the housing 12 at a first direction D1, which can be represented, but not limited, as a planar normal vector V2 of the first surface 121. As an external object is located above the housing 12, the optical sensing signal S1 is projected onto the external object, such that an optical modulated signal S2 may be generated by reflection, and the optical receiver 24 receives the optical modulated signal S2 reflected from the external object accordingly.

In the first embodiment, the optical diverting mechanism 16 is a detachable structure which includes a holder 26 and an optical reflecting component 28. The optical reflecting component 28 is assembled with the holder 26 and inclined relative to the first surface 121 while the optical diverting mechanism 16 and the housing 12 are assembled, so as to divert transmission of the optical sensing signal S1 from the first direction D1 to a second direction D2. The second direction D2 can be represented, but not limited, as a planar normal vector V1 of the second surface 122. The optical reflecting component 28 can be a flat reflector, an arc reflector or any other type of reflector capable of completely or partially reflecting the optical sensing signal S1 and the optical modulated signal S2. The flat reflector has the advantage of convenient storage, and the arc reflector has the advantage of increasing sensing efficiency by light convergence. As shown in FIG. 3, the holder 26 may be an annular component detachably disposed on the housing 12 via an opening 40 of the holder 26, and the holder 26 and the housing 12 are assembled manually to align the optical reflecting component 28 with the optical sensing module 14. In some other embodiments, the optical diverting mechanism 16 may be detachably disposed on the housing 12 through any other structure, which should not be limited in this disclosure.

The optical diverting mechanism 16 can be switched between several modes. For example, when the optical diverting mechanism 16 is in a first mode, the optical sensing signal S1 is directly projected, such that when such optical sensing signal S1 is projected onto the external object, the optical modulated signal S2 reflected from the external object is directly received by the optical receiver 24, which means the optical sensing signal S1 and the optical modulated signal S2 are transmitted at the first direction D1. When the optical diverting mechanism 16 is in a second mode, the optical sensing signal S1 is diverted to the second direction D2 by reflection of the optical diverting mechanism 16, the optical modulated signal S2 is diverted to the first direction D1 by reflection of the optical diverting mechanism 16, which means transmission direction of the optical signals is varied due to reflection.

Figure 10:
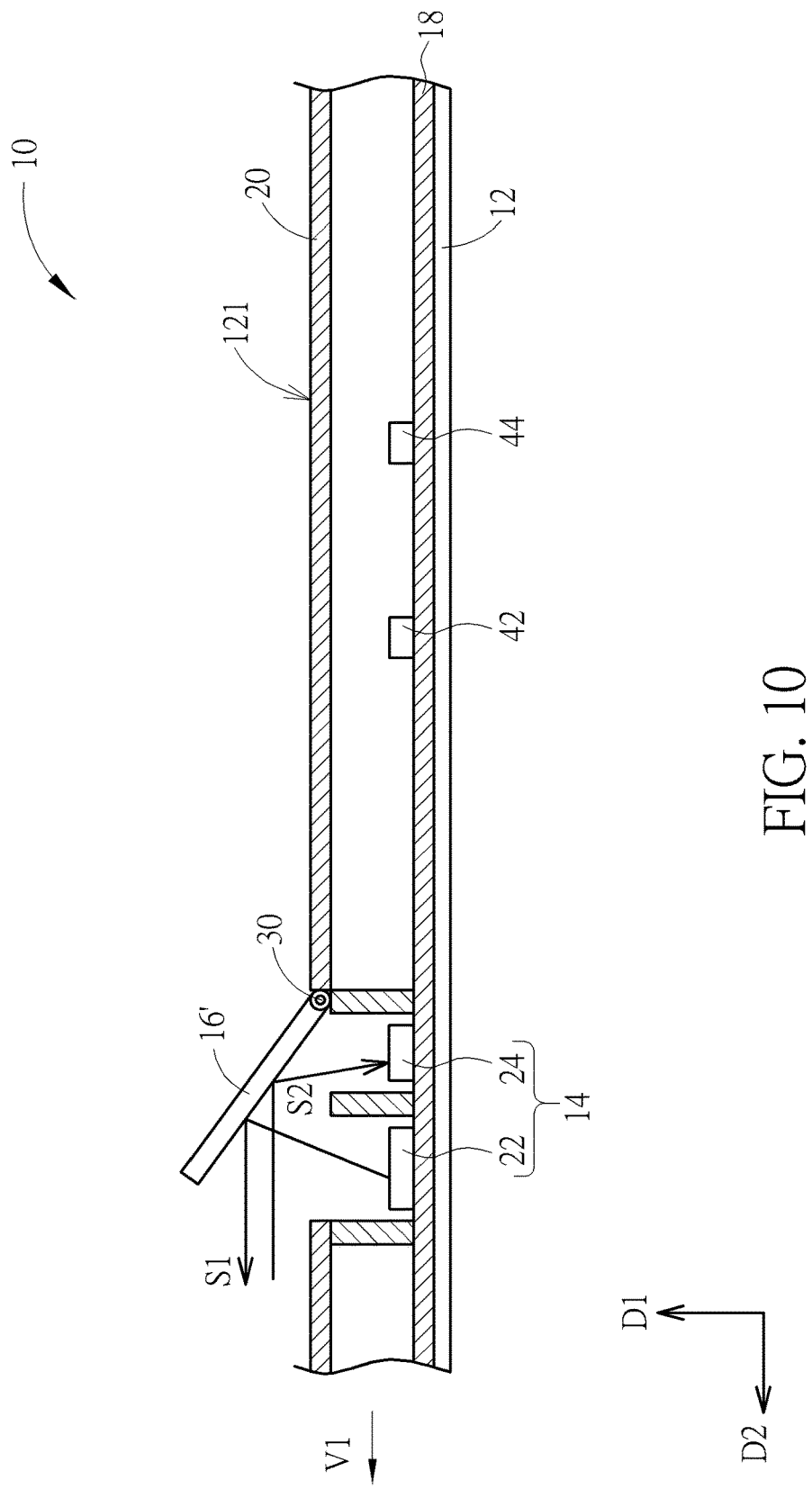
Figure 11:
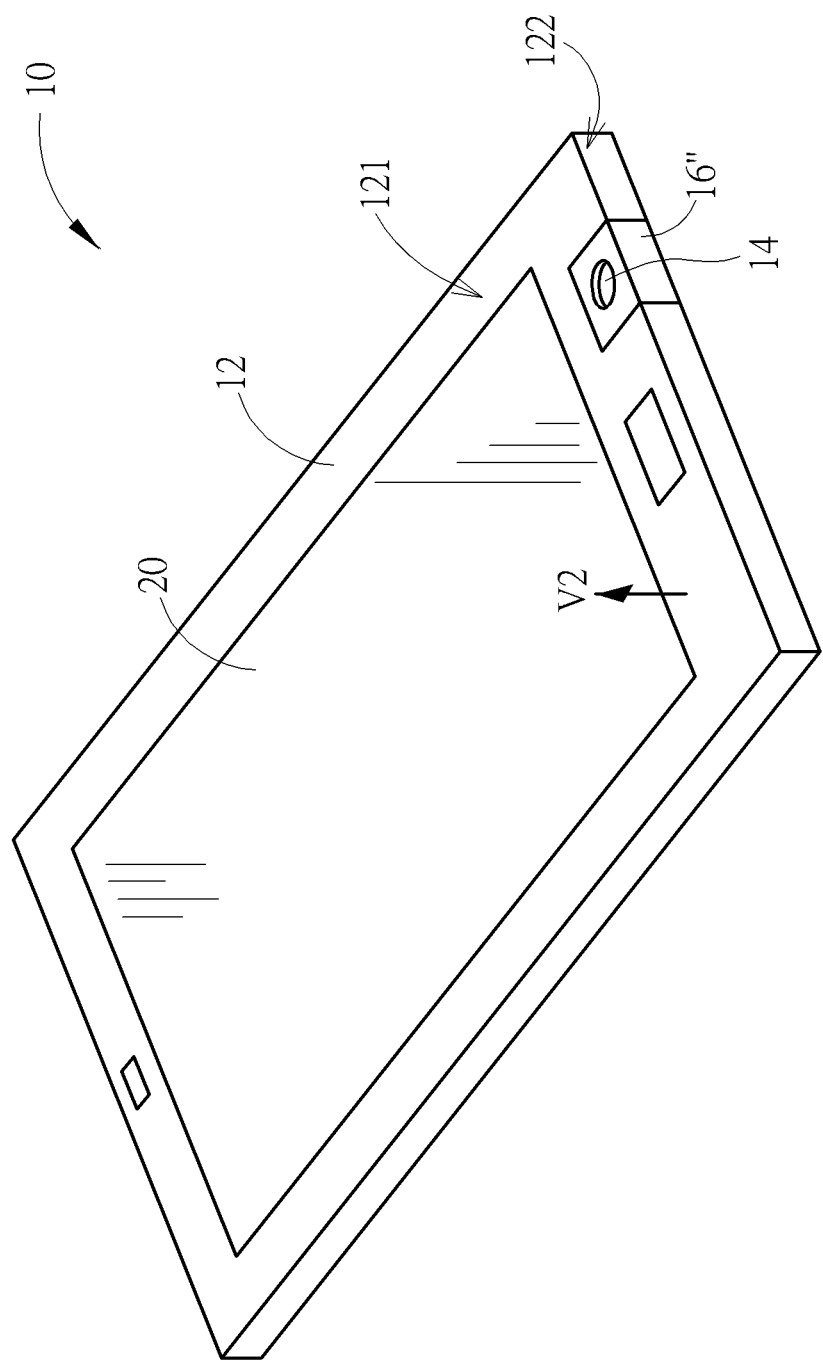
FIG. 11 and FIG. 12 respectively are diagrams of the portable device in different operational situations according to a third embodiment of the present invention.

Modes of the optical diverting mechanism 16 can be switched by shifting the optical diverting mechanism 16 relative to the housing 12, rotating the optical diverting mechanism 16' via a pivot 30 (as shown in FIG. 10), or rotating the optical diverting mechanism 16" to vary a facing direction of optical sensing module 14 (as shown in FIG. 11). Applications of the optical diverting mechanism are not limited to the above-mentioned embodiments, which depend on design demand. While the optical diverting mechanism 16 is separated from the housing 12 (i.e. the optical diverting mechanism 16 may be switched to the first mode), the optical sensing signal S1 is directly projected out the first surface 121 without reflection of the optical diverting mechanism 16. The optical receiver 24 receives the optical modulated signal S2 when the external object is located above the first surface 121, so as to trigger functions of the portable device 10, such like turning off the display screen 20 for energy economy; the optical receiver 24 receives no signal when the external object is not located above the first surface 121, and another function of the portable device 10 is triggered, such as turning on the display screen 20. While the holder 26 is installed on the housing 12 and adjacent by the optical sensing module 14 (i.e. the optical diverting mechanism 16 may be switched to the second mode), the optical reflecting component 28 is aligned with the optical sensing module 14, and the optical sensing signal S1 is reflected by the optical reflecting component 28 for diversion to substantially transmit along the planar normal vector V1 of the second surface 122. The optical sensing signal S1 can be projected onto the external object situated in front of the second surface 122, the optical modulated signal S2 reflected from the external object is received by the optical receiver 24. In some embodiments, a processing unit 42 electrically connected to the optical sensing module 14 may further analyze the optical modulated signal S2, for example, to acquire position relation between the external object and the second surface 122.

Figure 5:
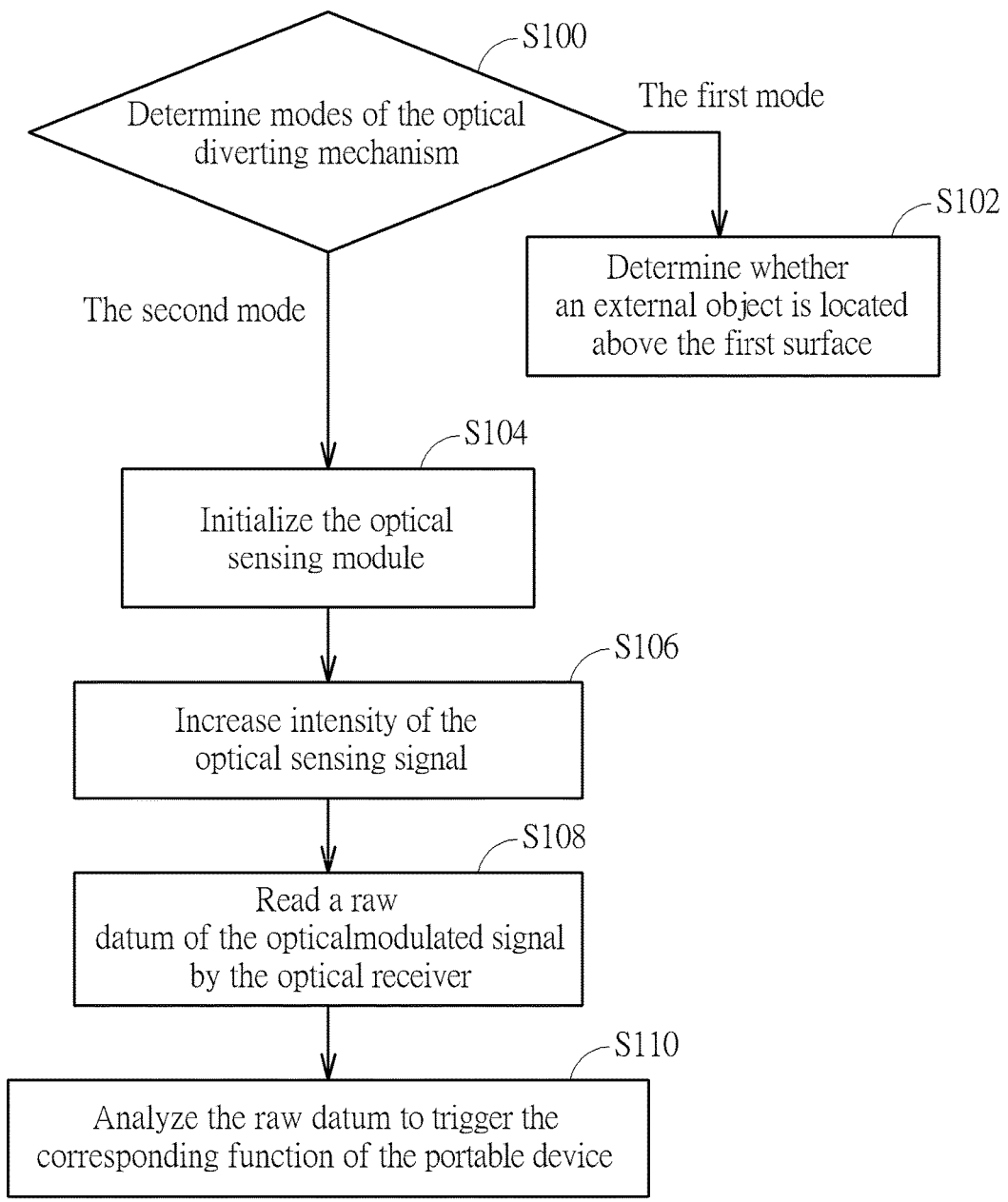
FIG. 5 is a flow chart of changing a sensing direction of an optical sensing module by switching functions of an optical diverting mechanism according to the first embodiment of the present invention.

Please refer to FIG. 5. FIG. 5 is a flow chart of changing a sensing direction of the optical sensing module 14 by switching functions of the optical diverting mechanism 16 according to the first embodiment of the present invention. First, step S100 is executed to determine which modes the optical diverting mechanism 16 is switched to. Step S102 is executed to determine whether the external object is located above the first surface 121 while the optical diverting mechanism 16 is switched to the first mode, and step S104 may be executed to initialize the optical sensing module 14 while the optical diverting mechanism 16 is switched to the second mode. In some embodiments, the second mode may be utilized to sense the distance of the external object relative to the second surface 122, step S106 may be executed to drive the optical emitter 22 to increase intensity of the optical sensing signal S1 according to setting of the second mode. In other words, the intensity of the optical sensing signal S1 in the second mode may be greater than intensity of the optical sensing signal S1 in the first mode. Then step S108 and step S110 are executed, the optical receiver 24 is driven to read a raw datum of the optical modulated signal S2, and the raw datum is analyzed to trigger the corresponding functions of the portable device 10 accordingly.

Figure 21:
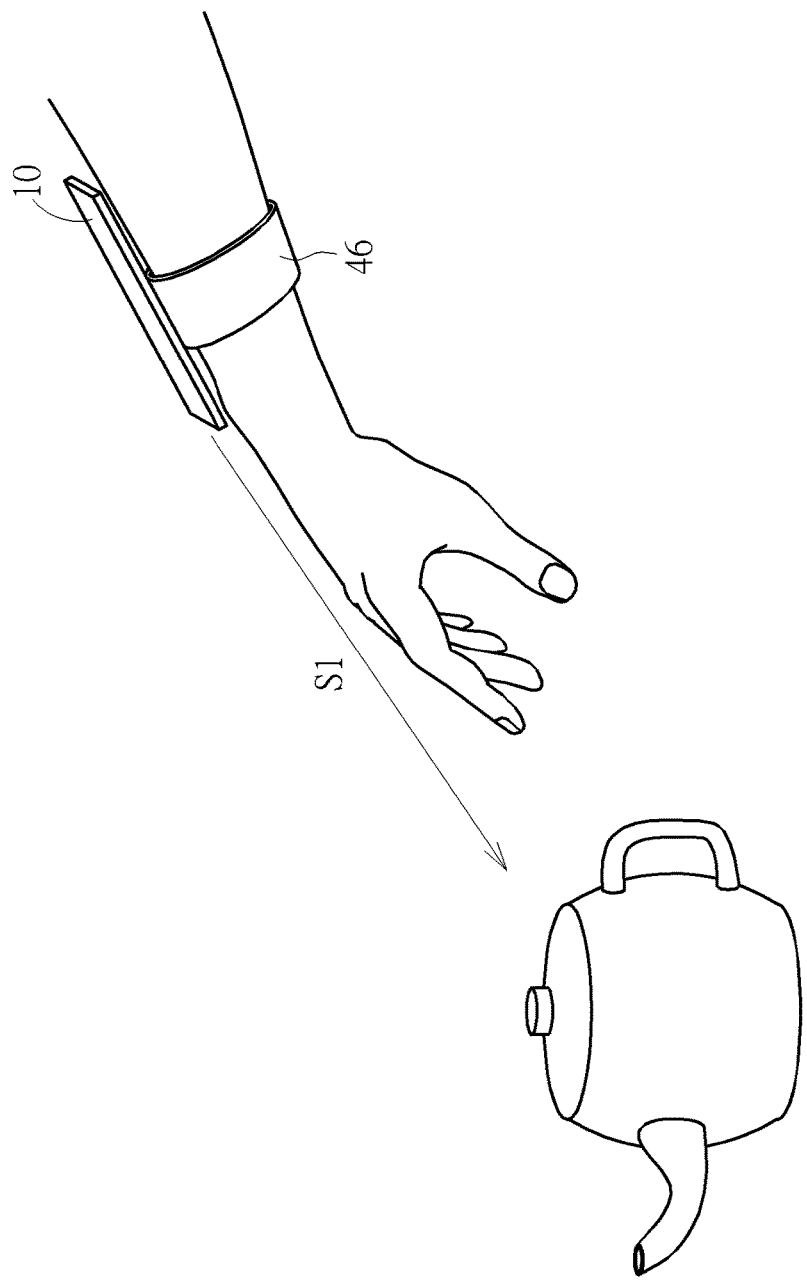
FIG. 21 is an application diagram of the portable device according to the embodiment of the present invention.

For example, a warning signal is generated (for example, by a sound generating unit 44 electrically connected to the processing unit 42) while the raw datum conforms to a specific term (for example, the external object is nearby the user who wears the portable device 10). Please refer to FIG. 21. FIG. 21 is an application diagram of the portable device 10 according to the embodiment of the present invention. The portable device 10 can be worn on the wrist or any limbs and trunk of the user optionally. As the user moves close to the external object, an audio frequency of the warning signal can be increased according to changed quantity of the raw datum; as the user moves away from the external object, the audio frequency can be decreased accordingly for friendly reminder. In some embodiments, the portable device 10 may be worn on any other position of a person (such like the upper arm, the leg, the neck or the chest) or fastened on a specific position according to different application.

Figure 6A:
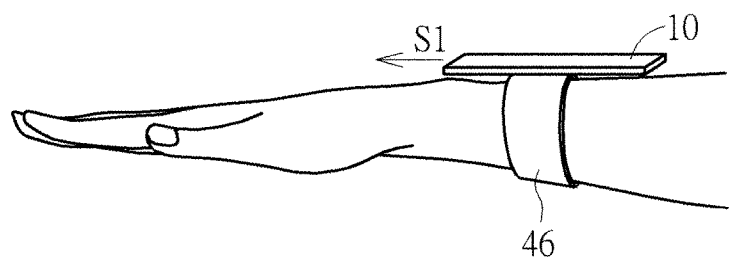
FIG. 6A and FIG. 6B respectively are diagrams of the portable device actually used in different situations according to the first embodiment of the present invention.
Figure 6B:
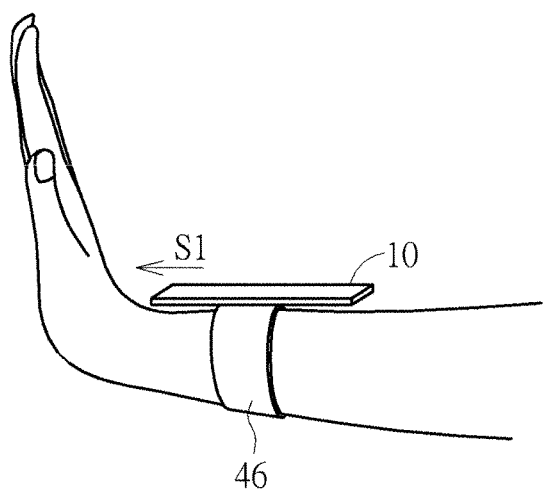

Please refer to FIG. 6A and FIG. 6B. FIG. 6 A and FIG. 6B respectively are diagrams of the portable device 10 actually used in different situations according to the first embodiment of the present invention in a first scenario. The portable device 10 can be a smart watch, a smart wristband or a mobile phone, which is held by the palm or tied on the wrist by a belt 46. In some embodiments, as shown in FIG. 6A, a user wearing the portable device 10 can clearly sense environmental circumstance before touching by the portable device 10, while taking an article, opening the door or walking in an unfamiliar place. Further, as shown in FIG. 6B, the user may move his/her palm upwardly or downwardly to affect transmission of the optical sensing signal S1, and gesture of the palm may be applied to turn on and turn off electrical equipment. In another embodiment, when the user moves his/her palm upwardly to block the transmission of the optical sensing signal S1, the portable device 10 may be triggered to detect gestures of the portable device 10; when the user moves his/her palm downwardly without blocking the transmission of the optical sensing signal S1, the detection of the gestures of the portable device 10 may be stopped.

Figure 7:
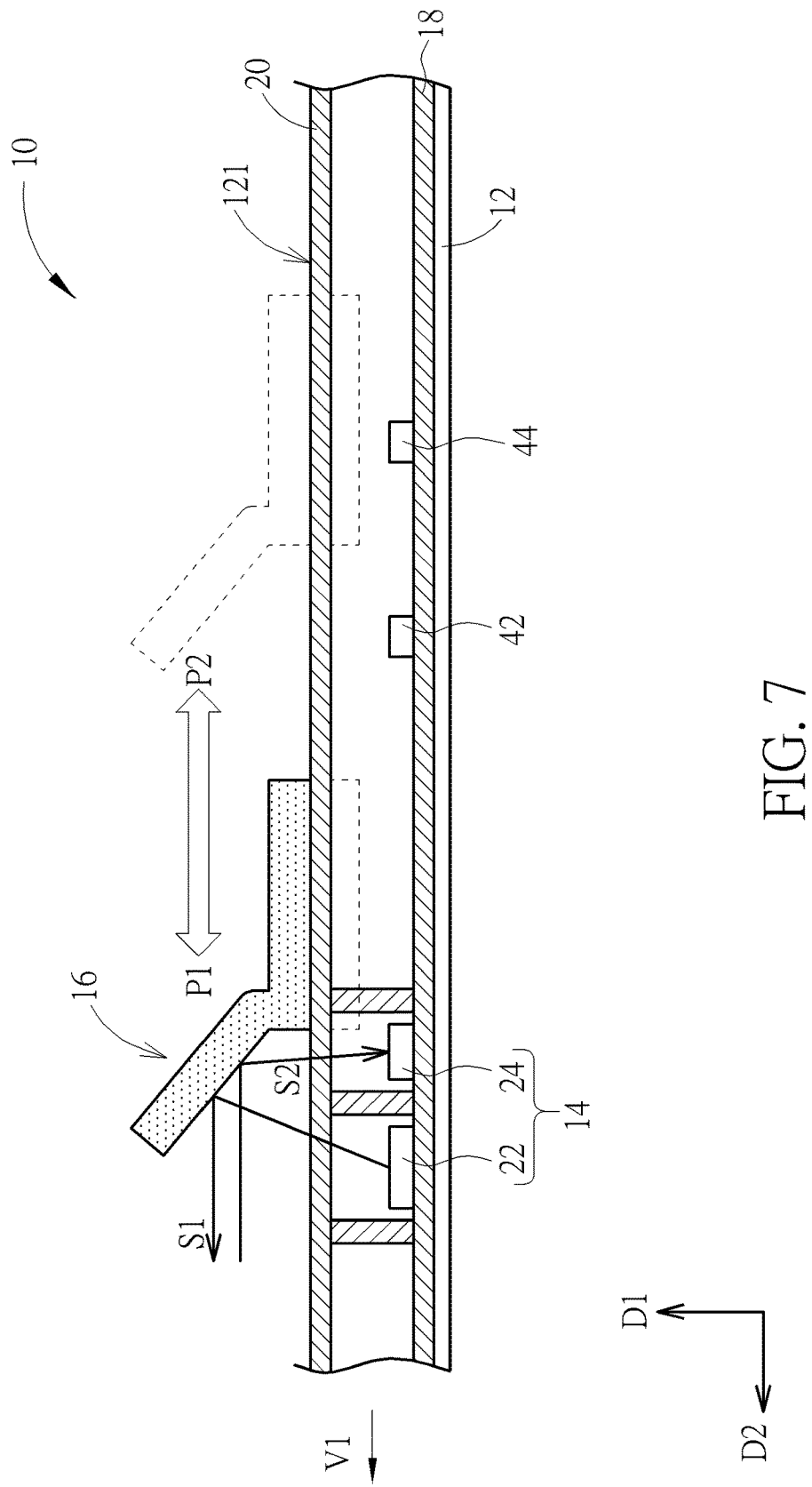
FIG. 7 is a sectional view of the portable device according to another embodiment of the present invention.

The holder 26 can be designed as a built-in unit slidably disposed on the housing 12. Please refer to FIG. 7. FIG. 7 is a sectional view of the portable device 10 according to another embodiment of the present invention. The holder 26 which is shown in FIG. 7 can be moved relative to the housing 12 via a slide track (not shown in figures). While the holder 26 is moved to a first position P1, the optical diverting mechanism 16 may be switched to the mode that the optical reflecting component 28 is able to align with the optical sensing module 14 to divert the optical sensing signal S1 toward the planar normal vector V1 of the second surface 122; while the holder 26 is moved to a position other than the first position P1 (for example, a second position P2), the optical diverting mechanism 16 may be switched to the mode that the optical reflecting component 28 misaligns with the optical sensing module 14, and the optical sensing signal S1 cannot be reflected by the optical reflecting component 28.

Figure 8:
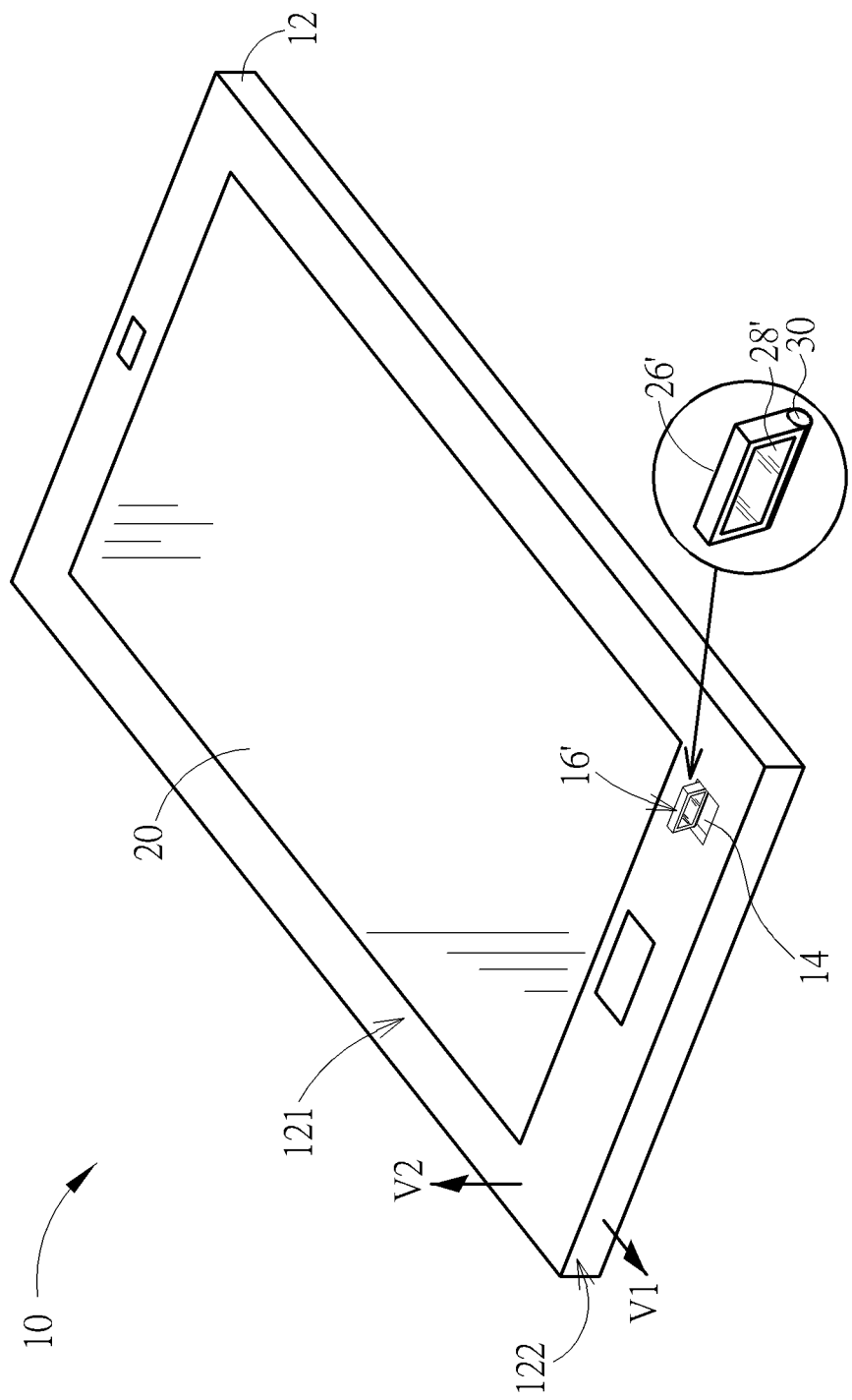
FIG. 8 is a diagram of the portable device according to a second embodiment of the present invention.
Figure 9:
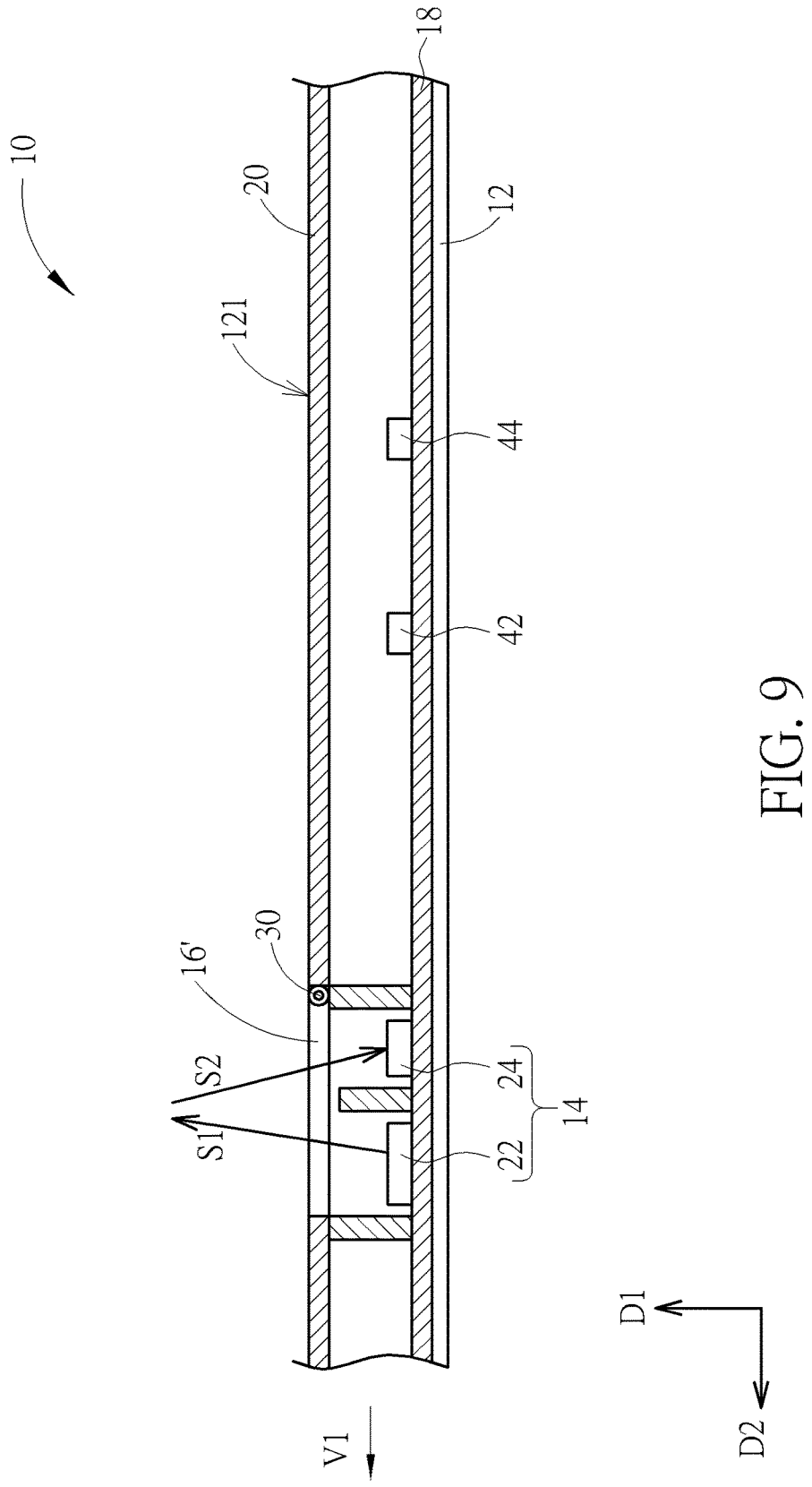
FIG. 9 and FIG. 10 respectively are sectional views of the portable device indifferent operational situations according to the second embodiment of the present invention.

Please refer to FIG. 8 to FIG. 10. FIG. 8 is a diagram of the portable device 10 according to a second embodiment of the present invention. FIG. 9 and FIG. 10 respectively are sectional views of the portable device 10 in different operational situations according to the second embodiment of the present invention. Difference between the first embodiment and the second embodiment is: the holder 26' is rotatably fixed to the housing 12 via the pivot 30, and the optical reflecting component 28' is a partial-transparent and partial-reflecting unit. As shown in FIG. 9, the optical diverting mechanism 16' is switched to the mode that the optical sensing signal S1 passes through the optical reflecting component 28' (which should be the partial-transparent and partial-reflecting unit), such that the optical sensing signal S1 may be projected onto the external object while the external object is located above the first surface 121, and the corresponding functions (such as turning on or off the display screen 20) of the portable device 10 can be triggered accordingly. As shown in FIG. 10, the optical diverting mechanism 16' is switched to the mode that the optical sensing signal S1 is diverted by the optical reflecting component 28' (which should be the partial-transparent and partial-reflecting unit) to transmit substantially along the planar normal vector V1 of the second surface 122, and then, the optical modulated signal S2 reflected from the external object can be analyzed to acquire related information (such as the position relation between the external object and the second surface 122).

Figure 12:
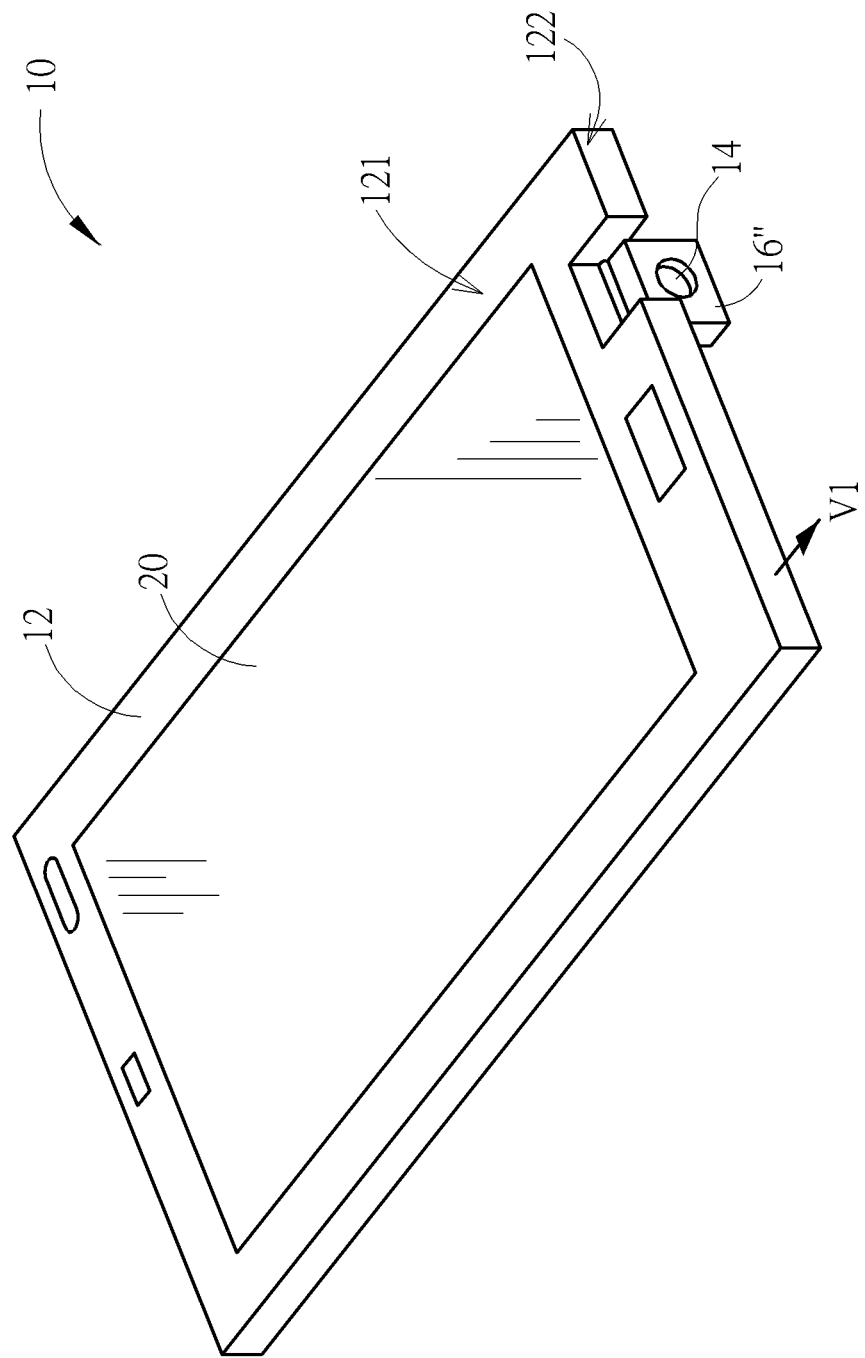
Figure 13:
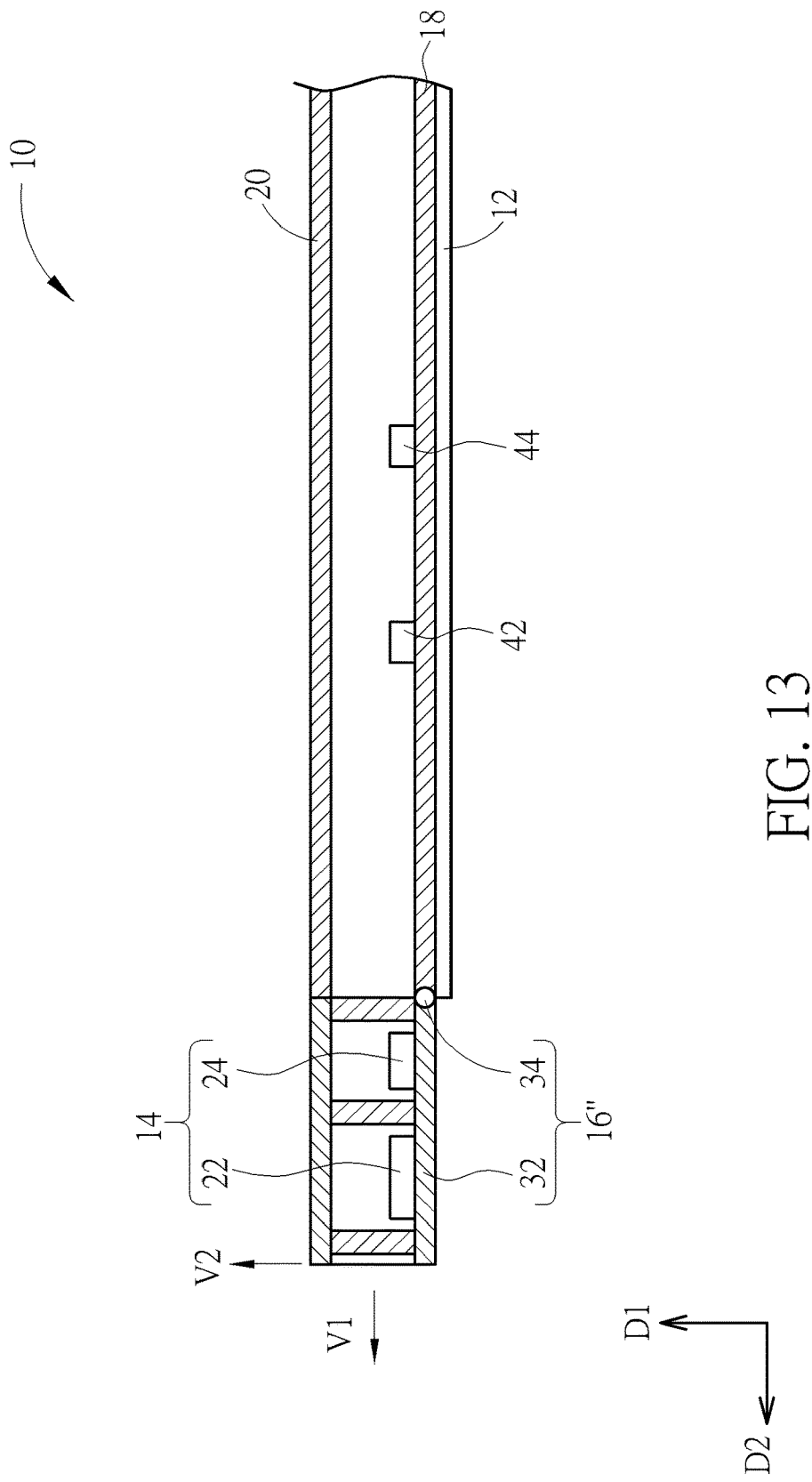
FIG. 13 and FIG. 14 respectively are sectional views of the portable device in different operational situations according to the third embodiment of the present invention.
Figure 14:
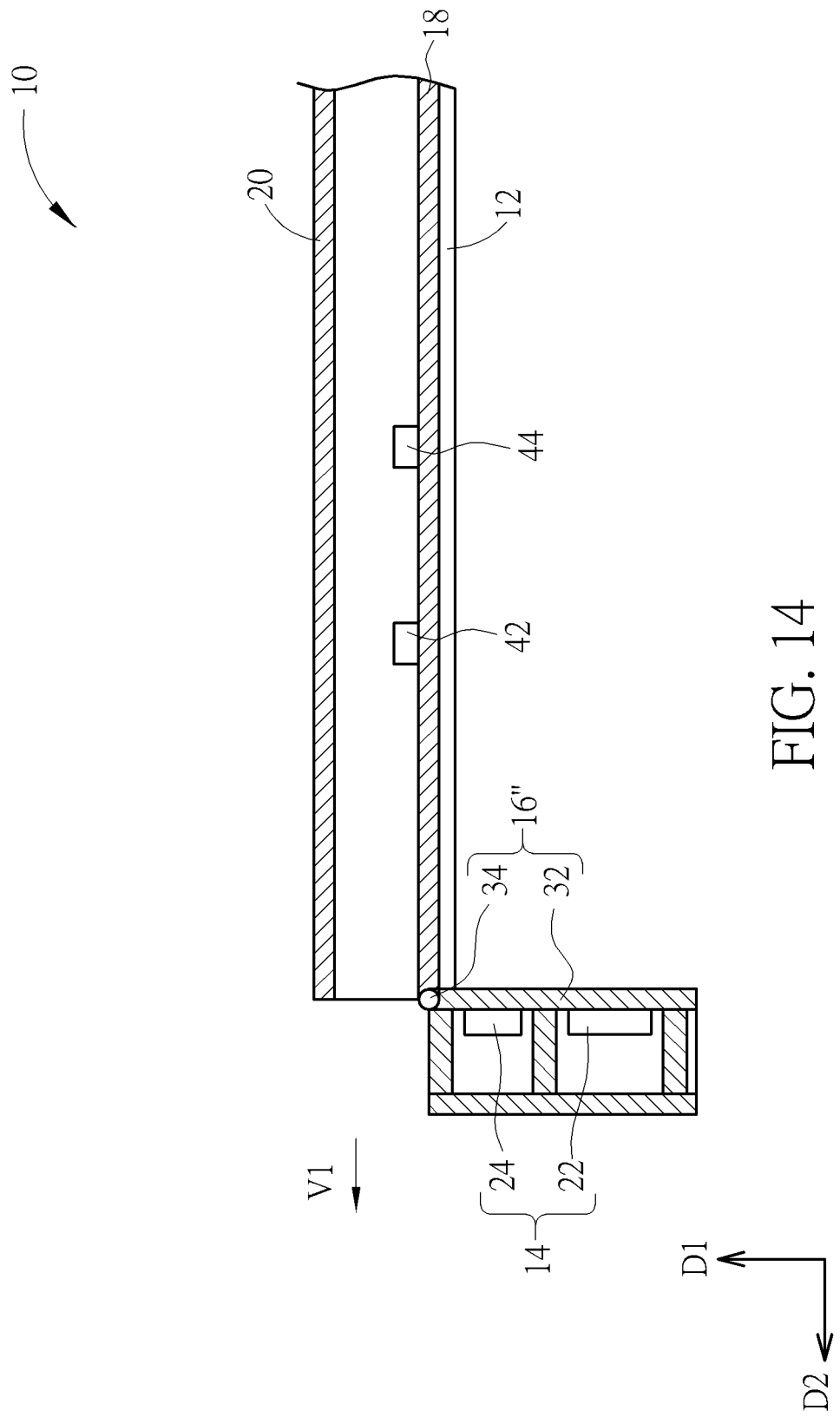

Please refer to FIG. 11 to FIG. 14. FIG. 11 and FIG. 12 respectively are diagrams of the portable device 10 in different operational situations according to a third embodiment of the present invention. FIG. 13 and FIG. 14 respectively are sectional views of the portable device 10 in different operational situations according to the third embodiment of the present invention. Difference between the third embodiment and the foresaid embodiments is: the optical diverting mechanism 16" includes a supporter 32 and a shaft 34. The optical sensing module 14 is carried by the supporter 32, and the supporter 32 is pivotally connected to the housing 12 via the shaft 34. The optical diverting mechanism 16" can rotate relative to the housing 12 for adjusting the rotary angle of the optical sensing module 14 relative to the housing 12, such that the optical diverting mechanism 16" can be switched between different modes. As shown in FIG. 11 and FIG. 13, the optical diverting mechanism 16" is switched to the mode that the optical sensing module 14 is set as a common state to project the optical sensing signal S1 along the planar normal vector V2 of the first surface 121. While the external object stayed upon the optical sensing module 14, the display screen 20 can be turned off by sensing result of the optical sensing module 14; while there is no external object above the optical sensing module 14, the display screen 20 can be turned on accordingly. As shown in FIG. 12 and FIG. 14, the optical diverting mechanism 16" is switched to the mode that the sensing direction of the optical sensing module 14 is changed, and the optical sensing signal S1 can be transmitted along a direction other than the planar normal vector V2 of the first surface 121 (for example, such direction for transmission may be the planar normal vector V1 of the second surface 122).

The optical sensing method applied to the portable device 10 of the second embodiment and/or the third embodiment is similar to ones of the first embodiment, and a detailed description is omitted herein for simplicity. The optical sensing method can be executed manually while the optical diverting mechanisms 16, 16', 16" are switched to the second mode, or further can be executed automatically while modes of the optical diverting mechanisms 16, 16', 16" are detected and confirmed as the second mode. Actuation of the optical sensing method of the present invention is not limited to the above-mentioned embodiments, which depends on design demand.

Figure 15:
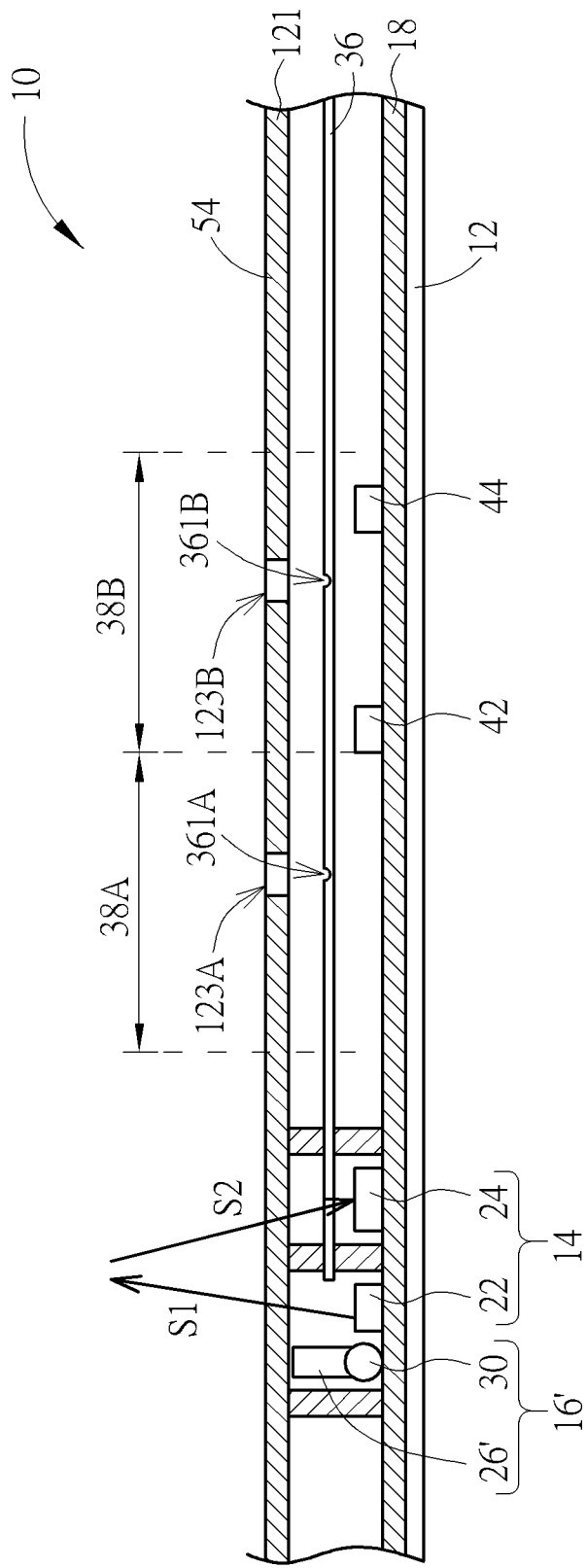
FIG. 15 and FIG. 16 respectively are sectional views of the portable device in different operational situations according to a fourth embodiment of the present invention.
Figure 16:
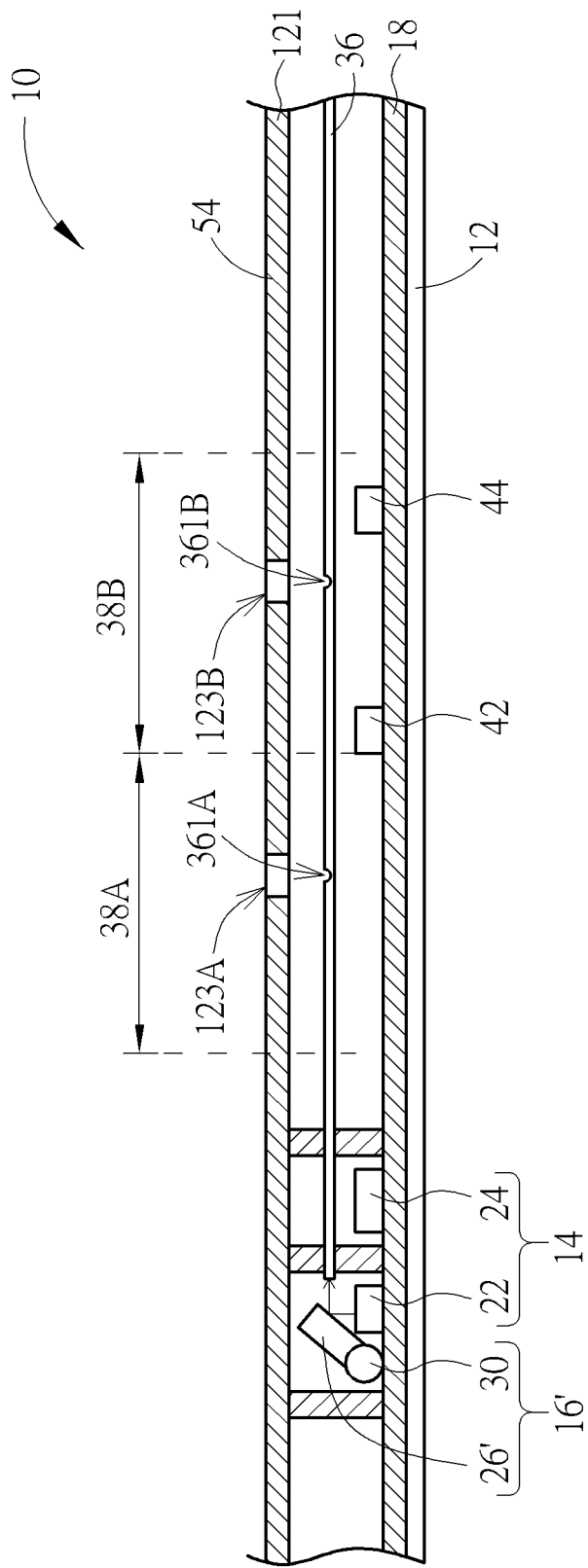
Figure 17:
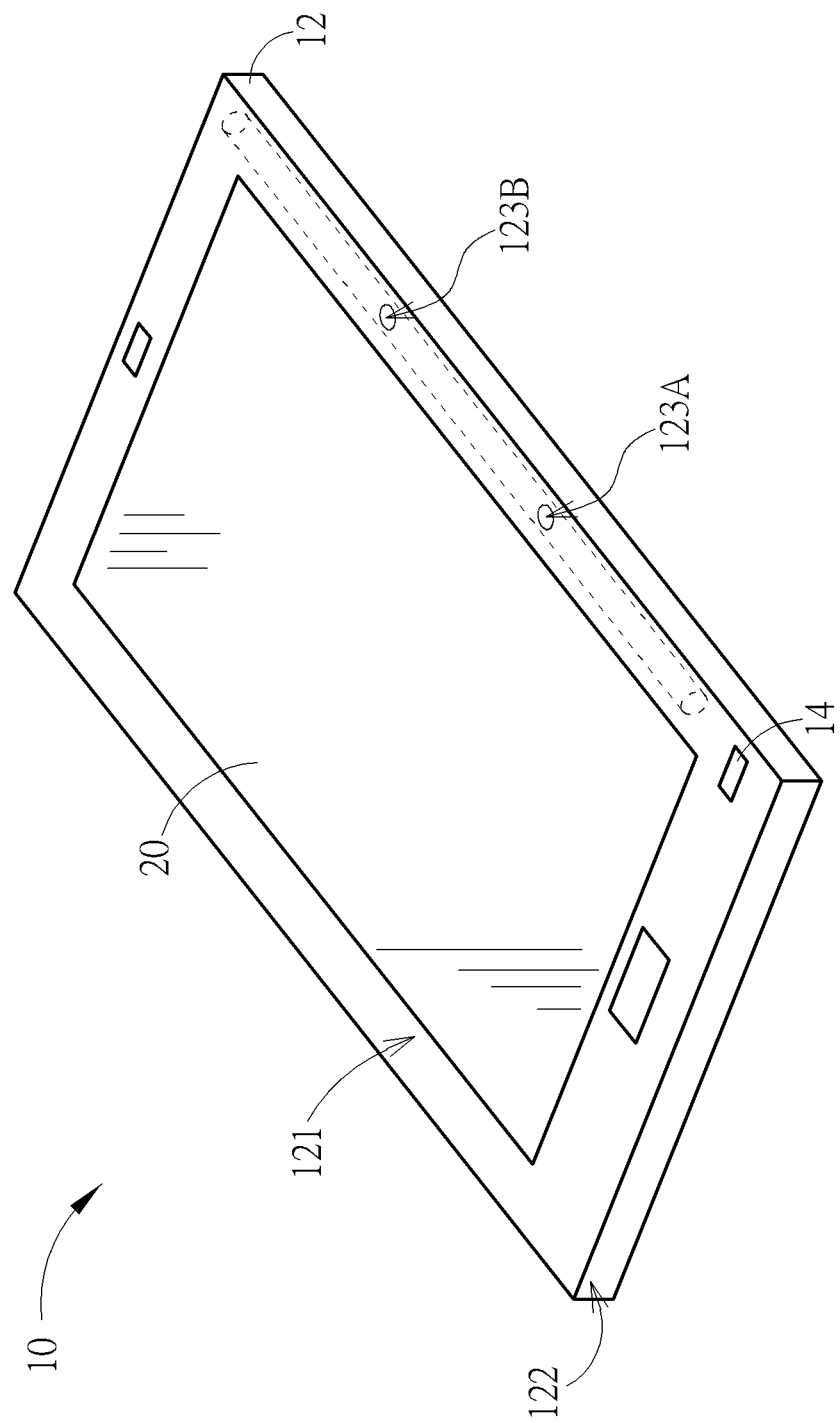
FIG. 17 is a diagram of the portable device having a light guiding component according to the fourth embodiment of the present invention.

Please refer to FIG. 15 to FIG. 17. FIG. 15 and FIG. 16 respectively are sectional views of the portable device 10 in different operational situations according to a fourth embodiment of the present invention. FIG. 17 is a diagram of the portable device 10 having a light guiding component 36 according to the fourth embodiment of the present invention. In the fourth embodiment, the optical diverting mechanism 16' includes the holder 26' and the pivot 30, the holder 26' is pivotally connected inside the housing 12 via the pivot 30, and the optical reflecting component is disposed on a surface of the holder 26'. Difference between the optical diverting mechanism 16' in the fourth embodiment and ones in the second embodiment is position of the holder 26' and the pivot 30. The portable device 10 of the fourth embodiment disposes the light guiding component 36 under a side of the first surface 121. The penetrant openings 123A and 123B are formed on the first surface 121, the light holes 361A and 316B are formed on the light guiding component 36, and an amount of the penetrant opening preferably conforms to an amount of the light hole. An end of the light guiding component 36 is disposed adjacent by the optical diverting mechanism 16' to align each light hole 361A (or the light hole 361B) with the corresponding penetrant opening 123A (or the penetrant opening 123B).

As shown in FIG. 15, the optical diverting mechanism 16' is switched to the mode that the optical sensing signal S1 passes through the first surface 121 without diversion, and the optical modulated signal S2 is received and may be analyzed for turning on and turning off the display screen 20 accordingly. As shown in FIG. 16, the optical diverting mechanism 16' is switched to the mode that the optical sensing signal S1 is diverted into the light guiding component 36 via the optical diverting mechanism 16', the optical sensing signal S1 is transmitted inside the light guiding component 36 by, for example, total internal reflection and emitted out of the housing 12 through the light holes 361A and 316B and the penetrant openings 123A and 123B; no matter where the external object moves over, the optical sensing module 14 can receive the optical modulated signal S2 reflected from the external object as long as the penetrant openings 123A and/or 123B are sheltered. That is, the light guiding component 36 of the fourth embodiment effectively increases a sensing range of the optical sensing module 14. In the fourth embodiment, the light guiding component 36 can be mainly composed of several sections 38A and 38B, and light guiding efficiency of the section 38A corresponding to the light hole 361A may be substantially identical with light guiding efficiency of the section 38B corresponding to the light hole 361B.

Figure 18:
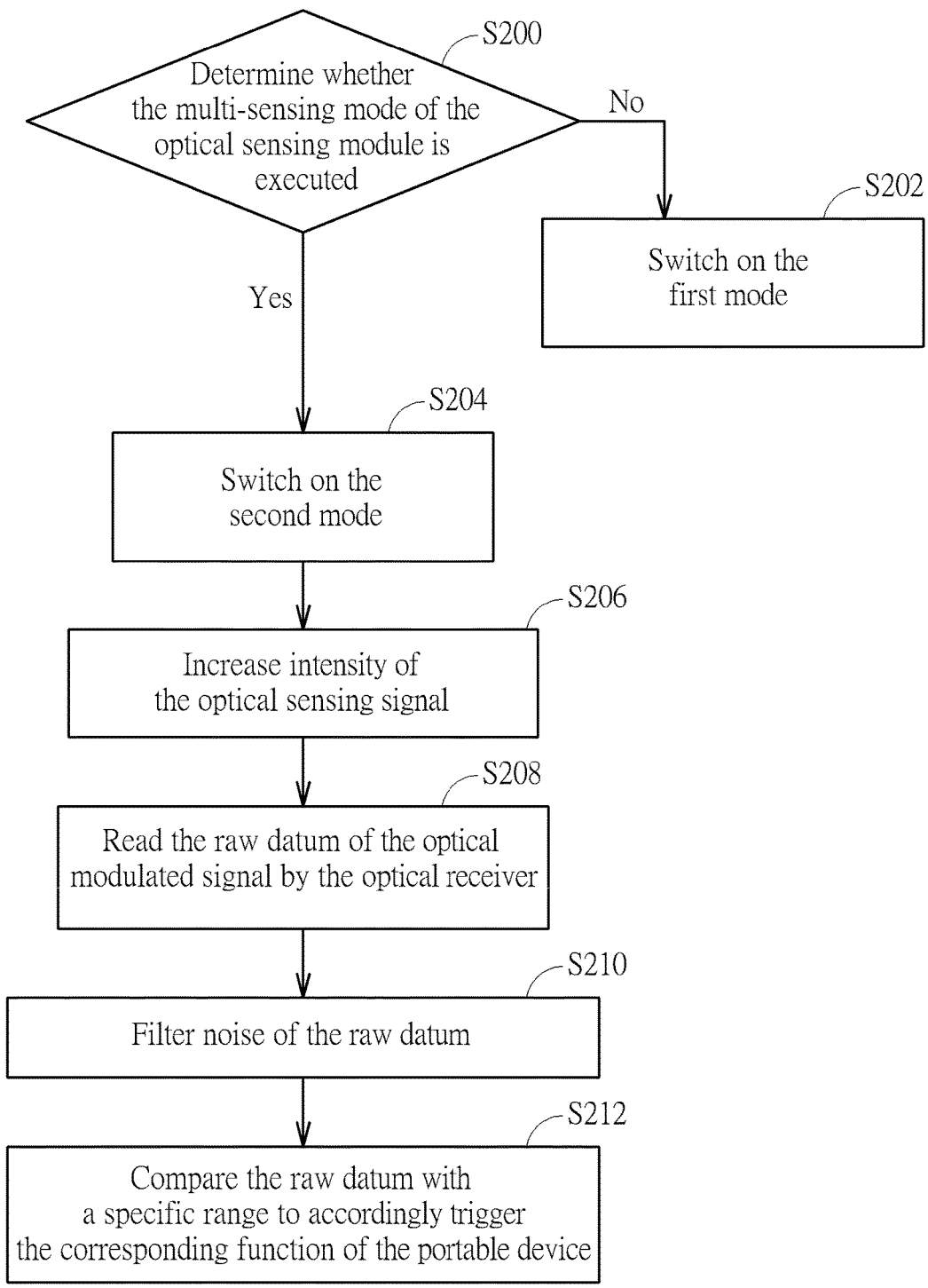
FIG. 18 is a flowchart of switching to the multi-sensing mode of the optical sensing module according to the fourth embodiment of the present invention.

Please refer to FIG. 18. FIG. 18 is a flow chart of switching to a multi-sensing mode of the optical sensing module 14 according to the fourth embodiment of the present invention. The optical sensing method illustrated in FIG. 18 is suitable for the portable device 10 shown in FIG. 15 to FIG. 17. First, step S200 is executed to determine whether the multi-sensing mode of the optical sensing module 14 is executed. If not, step S202 is executed to switch on the first mode; if yes, step S204 is executed to switch on the second mode. Then, steps S206 and S208 may be executed to increase intensity of the optical sensing signal S1 by the optical emitter 22 and to read the raw datum of the optical modulated signal S2 by the optical receiver 24. In some other embodiments, step 206 may be replaced with increasing the sensitivity of the optical receiver 24, which should not be limited in this disclosure. Step S210 is optionally executed to filter noise of the raw datum. Final, step S212 is executed to compare the raw datum with a specific range. If the raw datum does not conform to the specific range, corresponding functions of the portable device 10 is not triggered; if the raw datum conforms to the specific range, the corresponding functions of the portable device 10 is triggered, which means at least one penetrant opening 123A or 123B is sheltered, and, as a result, the sensing direction of the optical sensing module 14 is multipliable by the light guiding component 36.

Moreover, the light guiding component 36 can be designed as the light guiding efficiency of the section 38A is different from the light guiding efficiency of the section 38B. Difference between the light guiding efficiency of the sections 38A and 38B can be applied to sense a moving direction of the external object relative to the light guiding component 36. For example, the section 38A may have the first light hole 361A and a first threshold, the section 38B may have the second light hole 361B and a second threshold. The first threshold and the second threshold can be defined as some kind of the specific range. The first light hole 361A is located between the second light hole 361B and the optical diverting mechanism 16', and the first threshold is greater than the second threshold. While the raw datum is generated (which represents the first light hole 361A and/or the second light hole 361B are sheltered), the raw datum is utilized to compare with the first threshold and the second threshold.

As shown in FIG. 16, while the raw datum is greater than the first threshold but lower than a sum of the first threshold and the second threshold, it may indicate that the first light hole 361A is sheltered and the second light hole 361B is not sheltered, so it may imply that the external object moves relative to the portable device 10 from left to right; while the raw datum is lower than the first threshold but greater than the second threshold, it may indicate that the first light hole 361A is not sheltered and the second light hole 361B is sheltered, thus it may imply that the external object moves relative to the portable device 10 from right to left; while the raw datum is greater than the first threshold and a sum of the first threshold and the second threshold, it may indicate that the first light hole 361A and the second light hole 361B are both sheltered, the external object is located above the foresaid light holes 361A and 361B, hence moving direction of the external object can be determined accordingly.

Figure 19:
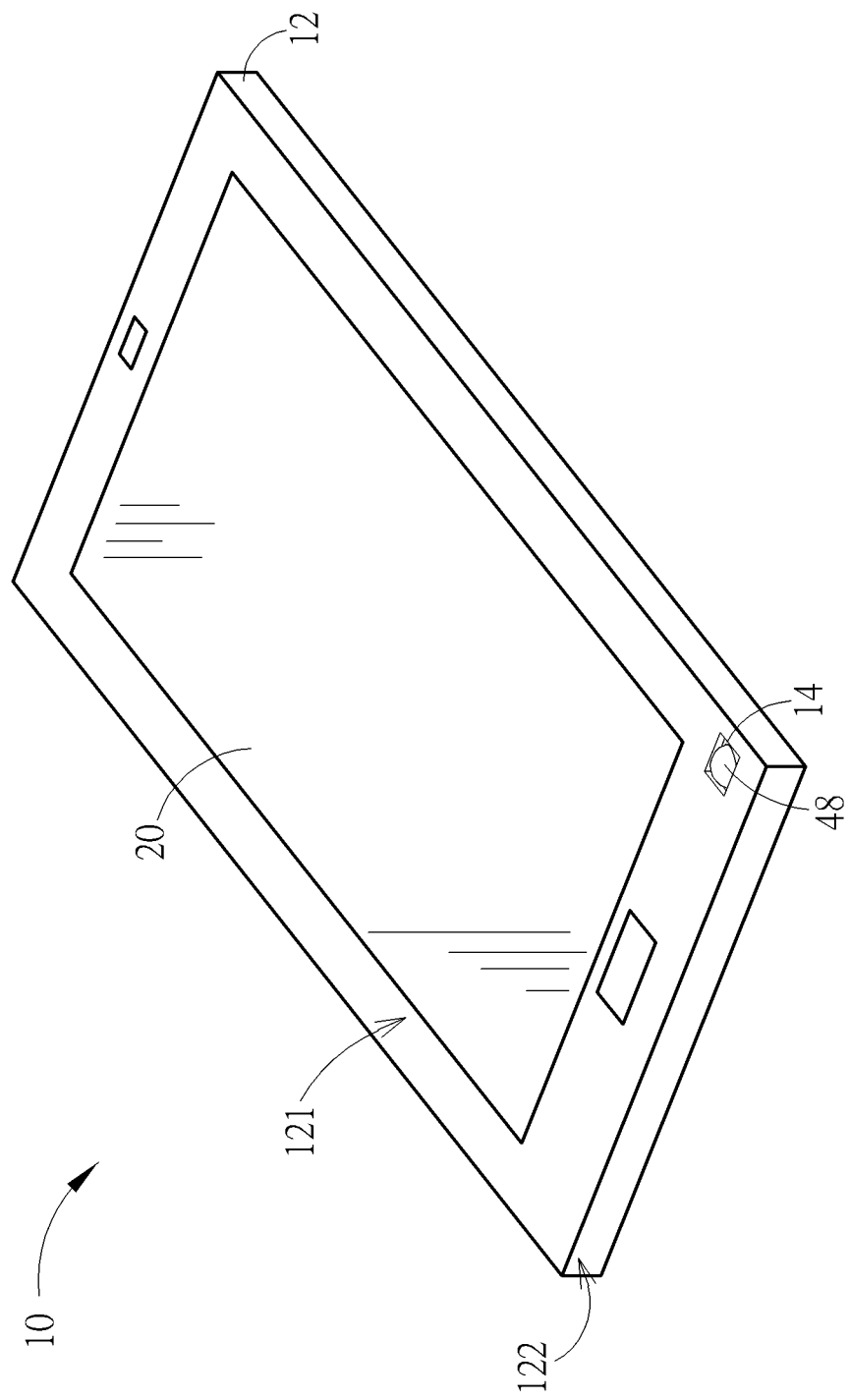
FIG. 19 is a diagram of the portable device with wide sensing angle according to a fifth embodiment of the present invention.
Figure 20:
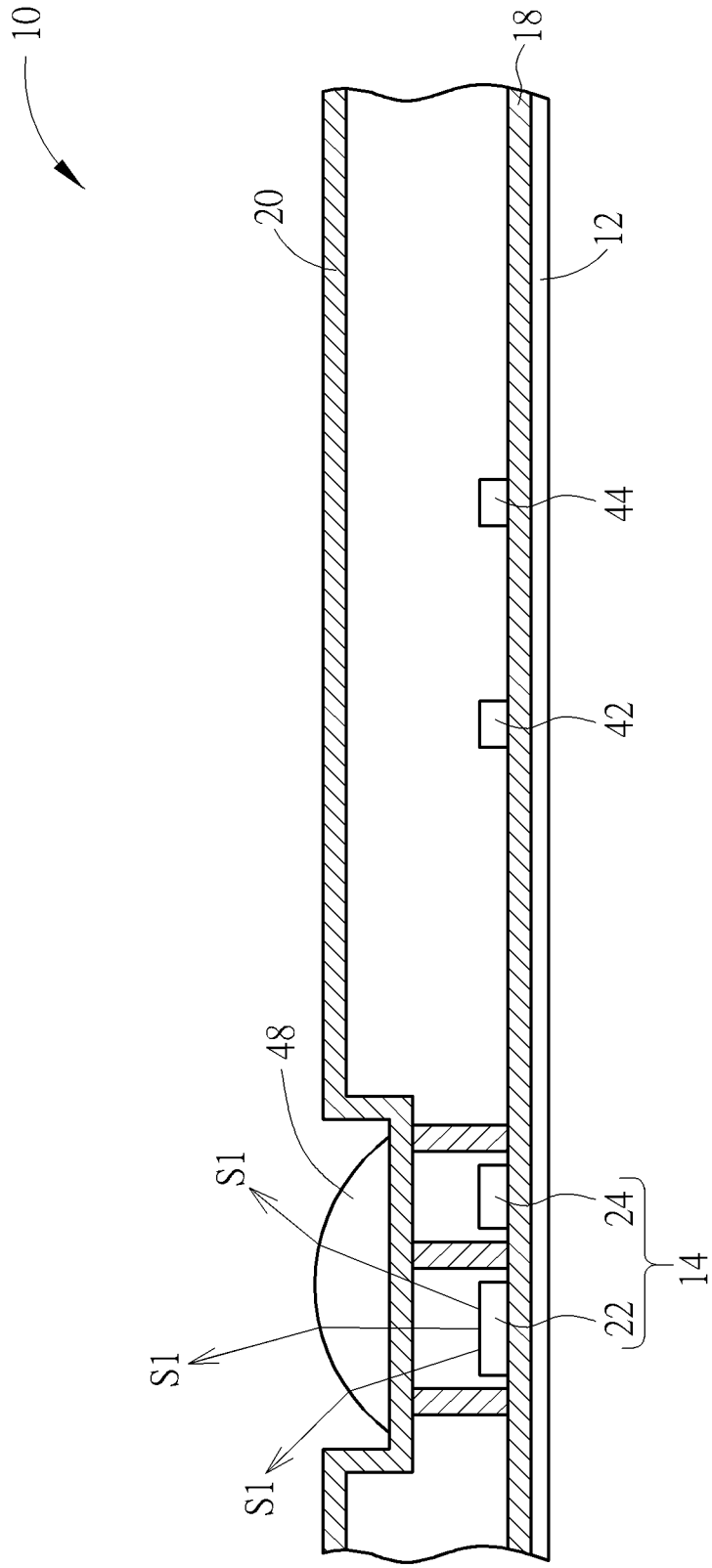
FIG. 20 is a sectional view of the portable device with the wide sensing angle according to the fifth embodiment of the present invention.

Please refer to FIG. 19 and FIG. 20. FIG. 19 is a diagram of the portable device 10 with wide sensing angle according to a fifth embodiment of the present invention. FIG. 20 is a sectional view of the portable device 10 with the wide sensing angle according to the fifth embodiment of the present invention. In the fifth embodiment, the portable device 10 further includes an optical modulating component 48 disposed upon the optical sensing module 14 and adapted to modulate an optical property of the optical sensing signal S1. For example, the optical modulating component 48 preferably can be a convex lens to diverge the optical sensing signal S1 to enlarge the sensing range of the optical sensing module 14, and the optical modulating component 48 can be a plug-in unit or a built-in unit optionally.

In conclusion, the portable device of the present invention utilizes the optical diverting mechanism to change signal transmission direction of the optical sensing module. The optical diverting mechanism can be the reflector or the rotary mechanical design, transmission direction of the optical sensing signal and the optical modulated signal is diverted by reflection of the reflector, arrangement of the optical emitter and the optical receiver is rotated by the rotary mechanical design. The optical sensing signal and the optical modulated signal can be visible light or invisible light. The optical diverting mechanism further can be cooperated with the light guiding component or the optical modulating component, the multi-sensing mode is executed by matching the light guiding component with the optical diverting mechanism, and the optical modulating component is applied to enlarge the sensing range of the optical sensing module. Comparing to the prior art, the portable device and the related optical sensing method of the present invention increase the sensing directions and enlarge the sensing range of the optical sensing module to provide more functions for ordinary proximity sensor embed in the portable device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable device with multiple optical sensing functions, comprising:
   a housing;
   an optical sensing module disposed inside the housing, comprising:
      an optical emitter adapted to emit an optical sensing signal out of the housing at a first direction; and
      an optical receiver disposed by the optical emitter and adapted to receive an optical modulated signal reflected from an external object; and
   an optical diverting mechanism adjacent by the optical sensing module, the optical sensing signal being directly projected while the optical sensing signal is not diverted by the optical diverting mechanism, and the optical sensing signal being transmitted to a second direction different from the first direction while the optical sensing signal is diverted by the optical diverting mechanism, the optical diverting mechanism comprising a supporter and a shaft, the optical sensing module being carried by the supporter, and the supporter being pivotally connected to the housing via the shaft.

2. The portable device of claim 1, wherein the optical diverting mechanism comprises a holder and an optical reflecting component, the optical reflecting component is inclined relative to a first surface of the housing through the holder, the optical sensing signal is projected onto the optical reflecting component for diversion.

3. The portable device of claim 2, wherein the holder is detachably disposed on the housing, or is a built-in unit inside the housing.

4. The portable device of claim 2, wherein the holder is rotatably fixed to the housing, and the optical reflecting component is a partial-transparent and partial-reflecting unit.

5. The portable device of claim 4, wherein the optical sensing signal passes through the partial-transparent and partial-reflecting unit for directly projection, and is reflected by the partial-transparent and partial-reflecting unit while the optical diverting mechanism is applied to divert transmission of the optical sensing signal.

6. The portable device of claim 2, wherein the optical reflecting component is a flat reflector or an arc reflector.

7. The portable device of claim 1, wherein the optical diverting mechanism rotates relative to the housing to adjust position of the optical sensing module relative to the housing, so as to switchably project the optical sensing signal at the first direction or the second direction by rotation of the optical sensing module.

8. The portable device of claim 1, further comprising:
   a light guiding component disposed on a side of the housing whereon at least one penetrant opening is formed, an end of the light guiding component being adjacent by the optical diverting mechanism to align a corresponding light hole of the light guiding component with the at least one penetrant opening, and the optical sensing signal being diverted into the light guiding component via the optical diverting mechanism.

9. The portable device of claim 8, wherein the light guiding component is mainly composed of several sections, each section comprises a light hole, and light guiding efficiency of each section is different from light guiding efficiency of another section.

10. The portable device of claim 9, wherein difference of the light guiding efficiency of the foresaid sections is applied to sense a moving direction of the external object relative to the light guiding component.

11. The portable device of claim 1, further comprising:
   an optical modulating component disposed upon the optical sensing module and adapted to modulate an optical property of the optical sensing signal.

12. The portable device of claim 11, wherein the optical sensing signal is diverged by the optical modulating component to enlarge a sensing range of the optical sensing module.

13. The portable device of claim 1, further comprising:
   a processing unit electrically connected to the optical sensing module, and adapted to determine a distance of the external object relative to the housing while the optical sensing signal is diverted by the optical diverting mechanism.

14. The portable device of claim 13, further comprising:
   a sound generating unit electrically connected to the processing unit, an audio frequency of the sound generating unit being adjusted by the processing unit according to the distance of the external object relative to the housing.

15. An optical sensing method capable of changing a sensing direction of an optical sensing module by functions of an optical diverting mechanism, the optical sensing module having an optical emitter for emitting an optical sensing signal and an optical receiver for receiving an optical modulated signal reflected from an external object, the optical sensing method being applied to a portable device having the optical sensing module and the optical diverting mechanism, the optical sensing method comprising:

driving the optical emitter to emit the optical sensing signal with a specific intensity while the optical diverting mechanism is not actuated to divert transmission of the optical sensing signal and the optical modulated signal;

driving the optical emitter to emit the optical sensing signal with an increased intensity while the optical diverting mechanism is actuated to divert transmission of the optical sensing signal and the optical modulated signal;

driving the optical receiver to read a raw datum of the optical modulated signal; and analyzing the raw datum to trigger functions of the portable device accordingly.

16. The optical sensing method of claim 15, wherein the portable device comprises a housing where inside the optical sensing module and the optical diverting mechanism are disposed, the optical sensing module is applied to detect position relation between the external object and the housing while the optical sensing signal is diverted to indirectly project onto the external object.

17. The optical sensing method of claim 15, wherein a step of analyzing the raw datum to trigger functions of the portable device accordingly further comprises:

generating a warning signal while the raw datum conforms to a specific term.

18. The optical sensing method of claim 17, wherein the step of analyzing the raw datum to trigger functions of the portable device accordingly further comprises:

adjusting an audio frequency of the warning signal according to quantity of the raw datum.

19. The optical sensing method of claim 15, wherein a light guiding component is disposed on a housing of the portable device whereon at least one penetrant opening is formed, a corresponding light hole of the light guiding component aligns with the at least one penetrant opening, and the optical sensing signal is diverted into the light guiding component via the optical diverting mechanism, the optical sensing method further comprises:

triggering the functions of the portable device while the at least one penetrant opening is sheltered and a multi-sensing mode of the optical sensing module by the light guiding component is executed.

20. The optical sensing method of claim 19, wherein the optical sensing method further comprises:

comparing the raw datum with a specific range while the multi-sensing mode is executed, and the sensing direction of the optical sensing module being multipliable by the light guiding component.

21. The optical sensing method of claim 19, wherein a first light hole and a second light hole are formed on the light guiding component to respectively align with two penetrant openings on the housing, the optical sensing method further comprises:

comparing the raw datum with a first threshold and a second threshold to determine whether the first light hole and the second light hole are sheltered.

22. The optical sensing method of claim 21, wherein the first light hole is located between the second light hole and the optical diverting mechanism, the first threshold is greater than the second threshold.

23. The optical sensing method of claim 21, wherein the first light hole is sheltered and the second light hole is not sheltered while the raw datum is greater than the first threshold but lower a sum of the first threshold and the second threshold.

24. The optical sensing method of claim 21, wherein the first light hole is not sheltered and the second light hole is sheltered while the raw datum is lower than the first threshold but greater than the second threshold.

25. The optical sensing method of claim 21, wherein the first light hole and the second light hole are sheltered while the raw datum is greater than the first threshold and a sum of the first threshold and the second threshold.

* * * * *

UNITED STATES PATENT AND TRADEMARK OFFICE
CERTIFICATE OF CORRECTION

PATENT NO. : 10,235,973 B2
APPLICATION NO. : 14/975851
DATED : March 19, 2019
INVENTOR(S) : Kui-Chang Tseng et al.

Page 1 of 1

It is certified that error appears in the above-identified patent and that said Letters Patent is hereby corrected as shown below:

On the Title Page

Item (73), correct the country of the assignee from "Hsin-Chu, Taiwan (CN)" to --Hsin-Chu (TW)--.

Signed and Sealed this
Seventh Day of May, 2019

Andrei Iancu
*Director of the United States Patent and Trademark Office*